(No Model.) 2 Sheets—Sheet 1.
J. JACKSON & G. C. BOROUGHS.
APPARATUS FOR CUTTING CLOTH.
No. 603,851. Patented May 10, 1898.
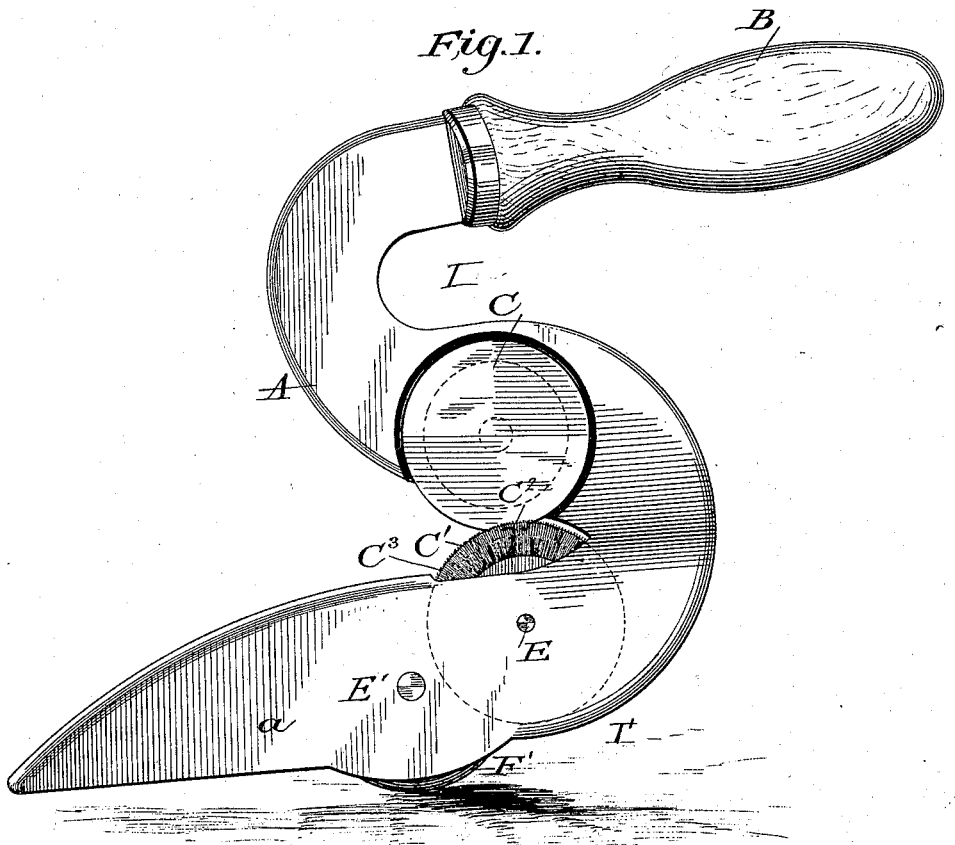
Witnesses.
Karl Kaelble
Geo. L. Wheelock
Inventors:
John Jackson and
George C. Boroughs
By Fowler & Riegner
Attorneys (No Model.) 2 Sheets—Sheet 2.
J. JACKSON & G. C. BOROUGHS.
APPARATUS FOR CUTTING CLOTH.
No. 603,851. Patented May 10, 1898.
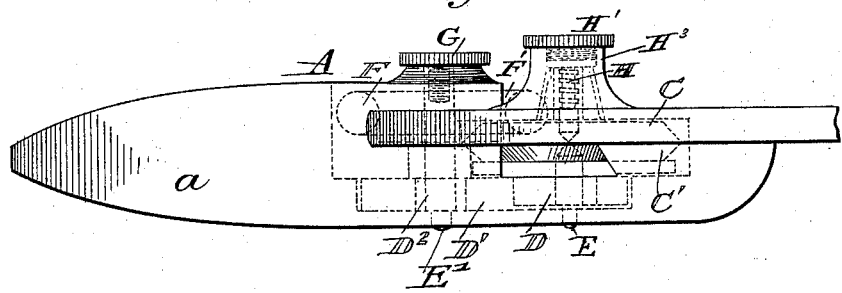
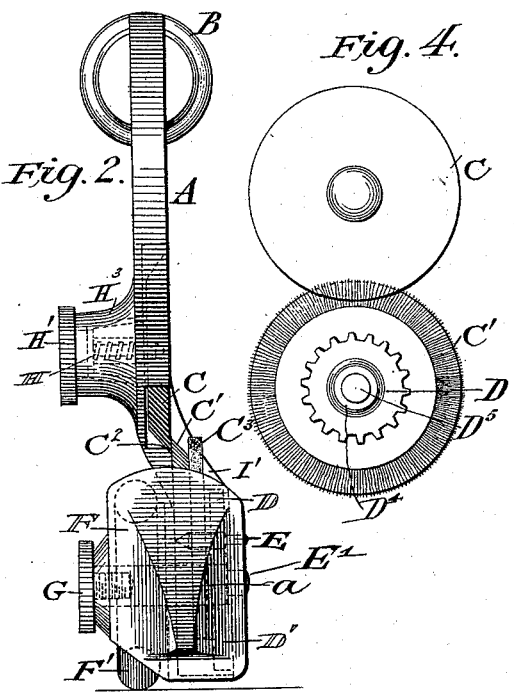
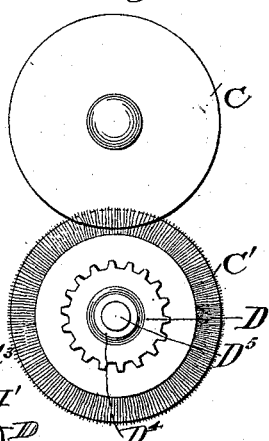
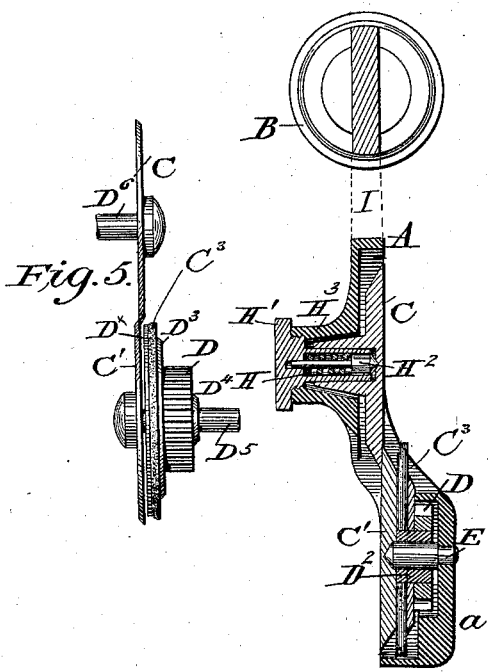

UNITED STATES PATENT OFFICE.

JOHN JACKSON AND GEORGE COLE BOROUGHS, OF BATTERSEA RISE, ENGLAND.

APPARATUS FOR CUTTING CLOTH.

SPECIFICATION forming part of Letters Patent No. 603,851, dated May 10, 1898.

Application filed August 13, 1897. Serial No. 648,184. (No model.)

*To all whom it may concern:*

Be it known that we, JOHN JACKSON and GEORGE COLE BOROUGHS, subjects of the Queen of Great Britain, residing at Battersea Rise, in the county of Sussex, England, have invented certain new and useful Improvements in Tools or Apparatus for Cutting Cloth, of which the following is a specification.

This invention relates to tools for cutting cloth and other material, and has for its object the production of simple tools that may be easily operated in cutting or shearing through various materials either in straight, curved, or angular continuous cuts without the labor of ordinary scissors or shears.

The invention consists of a tool for cutting cloth constructed substantially as hereinafter described, and defined in the claim.

Referring to the drawings, Figure 1 shows a side elevation of a tool for cutting cloth constructed according to our said invention. Fig. 2 shows a front elevation. Fig. 3 shows a top view. Figs. 4 and 5 are side and edge detail views of a modified form, and Fig. 6 is a vertical section of Fig. 1 through the cutting-disks.

Similar letters of reference indicate corresponding parts.

In Figs. 1, 2, and 3 the frame of the invention is marked A, and shown as a metal casting, though it may be formed up from sheet metal. On the upper part of the frame is affixed or formed a suitable handle B for the purpose of guiding or steering the apparatus. The lower part $a$ of the frame tapers from its front upward, so that the material to be severed may be lifted to the cutter-disks C C'. In the lower part $a$ of the frame A is formed a recess for the lower cutting-disk C', having a beveled cutting edge, which is secured upon a sleeve $D^2$. A pointed pin E is riveted to the lower part $a$ of the frame and passes through the sleeve $D^2$, so as to support the disk C'.

To the cutter-disk C' is secured a gear-wheel D of smaller diameter than the said cutter. The said gear-wheel D meshes with a larger gear-wheel D', by which the disk C' is rotated. The larger gear-wheel D' is secured to the end of a sleeve $D^2$, which rotates upon a fixed pin E', which is riveted to the frame. At the outer or opposite end of the sleeve $D^2$ is secured a driving-wheel F, on the periphery of which is secured a tire F' of flexible rubber or other suitable material. A portion of the tire F' projects below the lower edge of the frame, so that it may run or rotate upon a table or cutting-board. The driving-wheel is retained in position on the fixed pin by the thumb-screw G. In a recess in the upper part of the frame is pivoted the upper cutter C, having an opposite bevel on its cutting edge, to cutter C' and is so arranged that a small portion of its flat edge will press against and overlap at the part marked $C^2$ a small portion of the flat edge of the lower cutter C'. The cutter-disks are pressed together by a short spiral spring H, which rides in an orifice formed in the extended shank of the thumb-screw H'. The upper cutter C rotates upon said shank, and to minimize the frictional pressure of the coiled spring there is attached to its end a small center pointed plug $H^2$, the point of which presses against the end of the bearing in the upper cutter. The thumb-screw H' is screwed into a hollow boss $H^3$, formed upon the frame, and may be regulated by a lock-nut, if desired. For the purpose of feeding or drawing the material between or evenly up to the edges of the cutting-disks a thin disk $C^3$, of bristles or other suitable material, is affixed between the small gear-wheel and the outer side of the lower cutter C'. A space or opening I is formed in the upper part of the frame between the top of upper cutter and the handle formation, and a similar opening I' is provided between the bottom of the lower cutter and the table or cutting-board up to the tire on the periphery of the driving-wheel, so that the divided material may pass over or under the cutters and thus enable the operator to cut angles either to the right or left. By forming the cutters with conical bearings corresponding with the conically-pointed ends of the journal-pins the friction of the cutters in turning is reduced to a minimum.

Figs. 4 and 5 show a front and side elevation of a pair of thin cutting-disks that may fit into the frame A and be actuated similar to cutters C and C', as herein described. In this modification of the invention the upper circular cutter is marked C and the lower cutter C'. Their edges are held together by the washer $D^\times$, which is pressed by the rubber washer $D^3$, the whole being connected together by a sleeve $D^4$, which rotates upon a pin $D^5$. The upper cutter rotates upon a similar pin $D^6$. It will thus be seen that when the tool or apparatus is pushed or propelled on a board or cutting-table the driving-wheel is rotated and communicates motion to the lower cutter by means of the gearing, and the rotation of the upper cutter is effected by the frictional pressure on the edge of the lower cutter, when at the same time if the material to be severed is brought against the front part of the cutters marked $C^2$ it will be drawn between the cutting-disks by means of the feeding-bristles and severed. The construction of our invention is such that the operator in using has an uninterrupted view and may tilt the apparatus over to the right on the driving-wheel and by so doing bring the point of severing the material nearer the cutting of curves and angles. The material is always normally free and falls upon the cutting-board when severed.

Having thus described our invention, what we claim is—

In an apparatus for cutting cloth, the combination with a suitable frame, a thumb-screw arranged therein and having a hollow shank, conically-pointed journal-pins, one of the same being fixed and the other arranged movably in the hollow shank of said screw, and a helical spring also arranged in the hollow shank of said screw and acting on said movable journal-pin, of a driving-wheel, cutter-disks having conical bearings receiving the conically-pointed journal-pins, and suitable gearing between the driving-wheel and one of said cutter-disks, substantially as set forth.

In testimony that we claim the foregoing as our invention we have signed our names in presence of two subscribing witnesses.

JOHN JACKSON.
GEORGE COLE BOROUGHS.

Witnesses:
RUDOLPH CHAS. NICKOL,
HENRY DENIS HOSKINS.